United States Patent [19]

Oyler, deceased et al.

[11] 3,882,767

[45] May 13, 1975

[54] AUTOMATIC COOKING APPARATUS

[76] Inventors: Herbert J. Oyler, deceased, late of Dallas, Tex.; by Margaret Frances Oyler, executrix, 5108 Elkridge Dr., Dallas, Tex. 75227

[22] Filed: Feb. 15, 1974

[21] Appl. No.: 442,968

[52] U.S. Cl. .................. 99/339; 99/340; 99/446; 99/447; 126/21

[51] Int. Cl. ..................... A21b 1/24; F24b 7/04

[58] Field of Search ............ 99/339, 340, 421, 426, 99/443, 444, 446–447, 473; 126/19 R, 19 M, 21 R, 21 A, 273 R, 273 A, 275; 432/120, 144–145, 148, 152

[56] References Cited
UNITED STATES PATENTS

| | | | |
|---|---|---|---|
| 1,595,846 | 8/1926 | Wood | 99/446 |
| 2,558,569 | 6/1951 | Koch | 99/443 C |
| 2,604,033 | 7/1952 | Chadwick et al. | 99/340 X |
| 2,790,380 | 4/1957 | Shryack | 99/443 R X |
| 2,851,941 | 9/1958 | Cogar | 99/339 X |
| 2,920,177 | 1/1960 | Brane | 99/339 UX |
| 3,098,428 | 7/1963 | Maxwell | 99/446 |
| 3,223,022 | 12/1965 | Powell | 99/473 |
| 3,340,794 | 9/1967 | Giuliano | 99/443 C |
| 3,477,360 | 11/1969 | Raney | 99/339 |
| 3,612,032 | 10/1971 | Kweller et al. | 126/21 A |

*Primary Examiner*—Billy J. Wilhite
*Assistant Examiner*—Arthur O. Henderson
*Attorney, Agent, or Firm*—Howard E. Moore; Gerald G. Crutsinger

[57] ABSTRACT

An oven having automatic controls for regulating heat emanated from a fire box having a passage over said fire box to facilitate initial ignition of fuel. Closure means is positionable over the passage after fuel has been ignited to direct heated air and smoke into a cooking compartment.

6 Claims, 10 Drawing Figures

AUTOMATIC COOKING APPARATUS

BACKGROUND OF INVENTION

The present invention relates improvements in sin cooking apparatus disclosed and claimed in U.S. Pat. No. 3,041,959 which issued July 3, 1962, to Herbert J. Oyler, entitled "Means for Barbecuing Meat"; U.S. Pat. No. 3,266,409 which issued Oct. 16, 1966, entitled "Barbecuing Oven"; and U.S. Pat. No. 3,491,678 which issued Jan. 27, 1970, entitled "Barbecue Cooking Oven".

The aforementioned patents are directed to barbecuing ovens in which hot gases and smoke from burning charcoal, wood or other fuel are routed around meat placed on racks inside the oven. The temperature in each of the ovens was controlled by thermostatically actuated dampers and switches were provided to be actuated by access doors to exhaust smoke and hot gases through a smoke stack thereby producing barbecue cooking ovens which could be safely mounted inside a restaurant while requiring a minimum of attention.

Barbecue cooking ovens of the type described in the above patents are particularly adapted for use in commercial establishments where the fire is seldom extinguished and therefore kindling the fire is not a major problem. However, in using the barbecuing oven on a temporary or periodic basis the fire is extremely difficult to kindle because a cold stack will not draw air. Therefore, a structure in which heat from a fire box is admitted to a cooking compartment above meat racks will not readily permit circulation of air in the required manner downwardly around and above the level of the meat racks to the stack until the fire produces substantial heat.

SUMMARY OF INVENTION

The improved oven structure comprises a cooking compartment and a fire box connected by a duct adjacent upper portions thereof. The cooking compartment has an exhaust passage at a lower elevation than the elevation of the outlet from the duct such that heated air and smoke passing from the fire box through the duct into the cooking compartment flows downwardly through the duct into the coooking compartment flows downwardly through meat racks.

The relative positions of the outlet from the duct and the exhaust passage provides substantially uniform heat above and below the meat racks and maintains a moist atmosphere about the meat racks to prevent excessive drying of meat while cooking.

The duct between the fire box and cooking compartment has two outlet passages, the first communicating directly with atmosphere outside the oven and the second communicating with the cooking compartment. The first outlet passage is opened while kindling a fire in the fire box. After combustion of fuel in the fire box produces upward flow of heated air the first outlet passage is closed directing heat through the cooking compartment to the exhaust passage.

Thermostatically controlled dampers in an inlet passage to the fire box and in the outlet passage from the duct communicating with the cooking compartment maintained a predetermined cooking temperature in the cooking compartment.

A primary object of the invention is to provide an improved cooking oven particularly adapted to facilitate kindling fuel in a fire box adjacent a cooking compartment.

Another object of the invention is to provide an improved cooking oven for automatically controlling the temperature inside the cooking compartment and controlling the path of smoke and heat therethrough, providing optimum cooking conditions for enhancing the flavor and tenderness of meat.

Another object of the invention is to provide an improved cooking oven wherein the meat racks are located above a passage through which smoke and gases are exhausted from a cooking compartment thus retaining moisture in the cooking compartment.

A further object of the invention is to provide an improved barbecuing oven having meat racks which are easily removed to clean and to facilitate maintenance of sanitary conditions.

A still further object of the invention is to provide an improved automatic barbecue cooking oven which can be safely used periodically for cooking or smoking food.

Other and further objects of the invention become apparent upon referring to the detailed description hereinafter following and to the drawing annexed hereto.

DESCRIPTION OF DRAWING

Drawings of two preferred embodiments of the invention are annexed hereto so that the invention may be better and more fully understood, in which.

Numeral references are employed to designate like parts throughout the various figures of the drawing.

DESCRIPTION OF A FIRST EMBODIMENT

Figure 1:
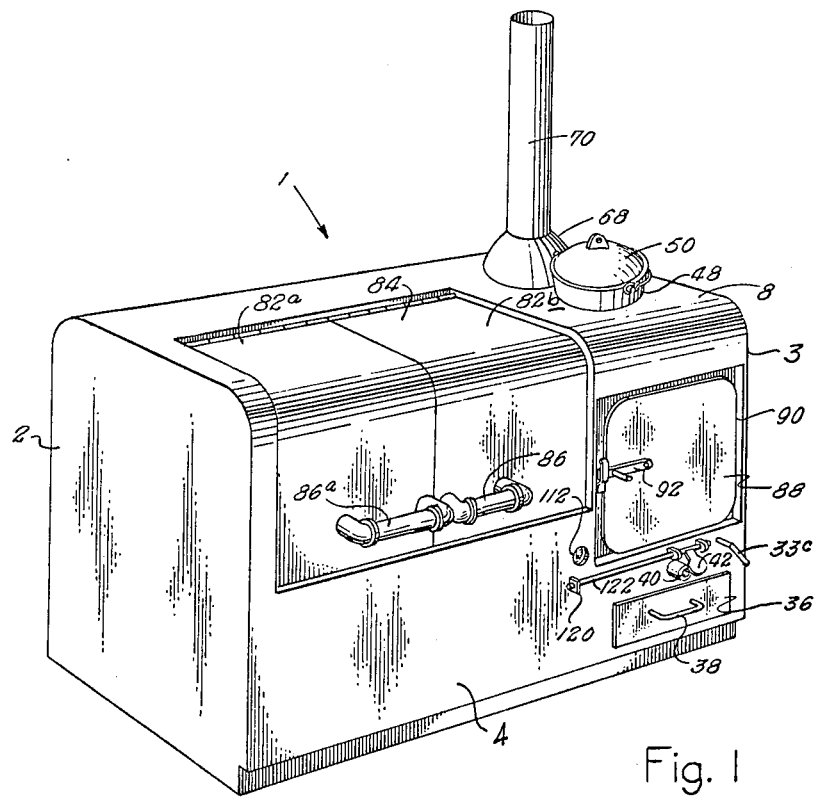
FIG. 1 is a front perspective view of a first embodiment of the cooking oven.
Figure 4:
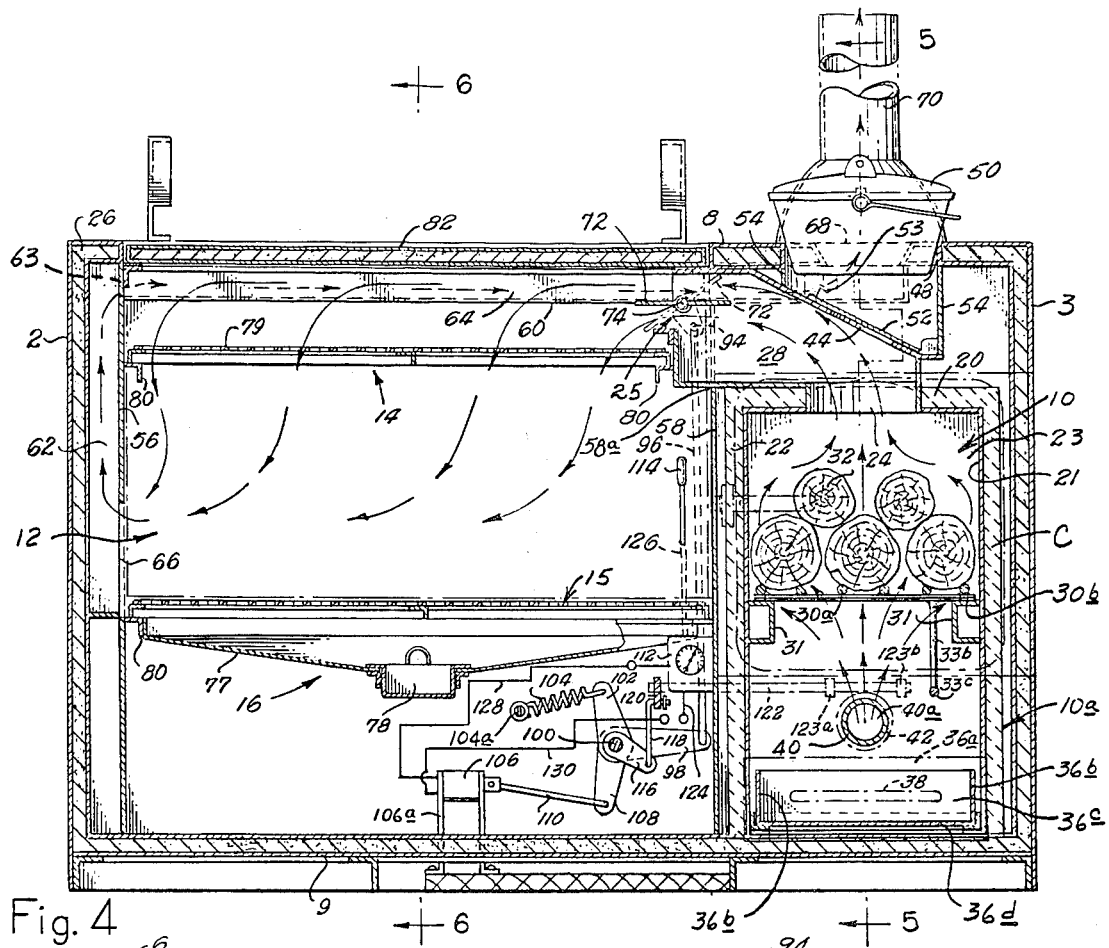
FIG. 4 is a cross-sectional view taken along line 4—4 of FIG. 3.

Referring to FIGS. 1 and 4 of the drawing the numeral 1 generally designates automatic cooking apparatus included in a housing comprising side walls 2 and 3, a front wall 4, a back wall 6, a top 8 and a bottom 9 constructed of any suitable material, such as based sheet metal panels having insulation material 26 positioned therebetween.

As best illustrated in FIG. 4, a partition 58 divides the interior of the housing into separate compartments including a fire box compartment 10 and a cooking compartment 12. The cooking compartment 12 has meat racks 14 and 15 and a drip pan 16 mounted therein as will be hereinafter more fully explained.

Figure 2:
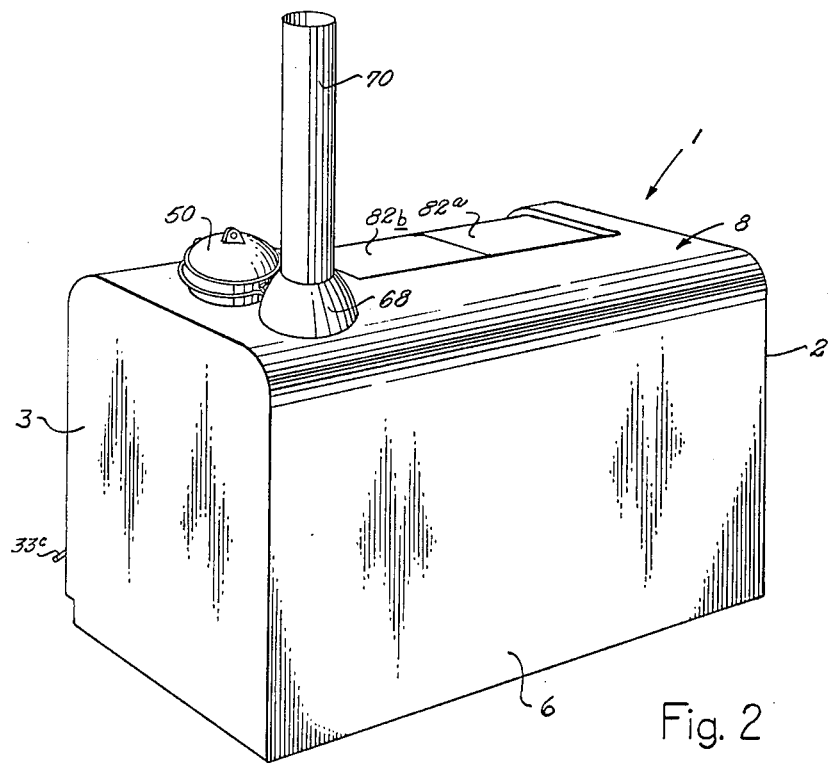
FIG. 2 is a rear perspective view of the embodiment illustrated in FIG. 1.

As best illustrated in FIGS. 1 and 2 of the drawing, an access opening extends through the front wall 4 and top 6 of the housing and is closed by access doors 82a and 82b hingedly connected to the top 8 of the housing. The front wall 4 of the housing also has an opening formed therein communicating with the fire box compartment 10 which is closed by fire box door 88. Air is introduced into the fire box compartment 10 through an inlet passage 40 and ashes are collected in a removeable drawer or ash box 36.

Figure 5:
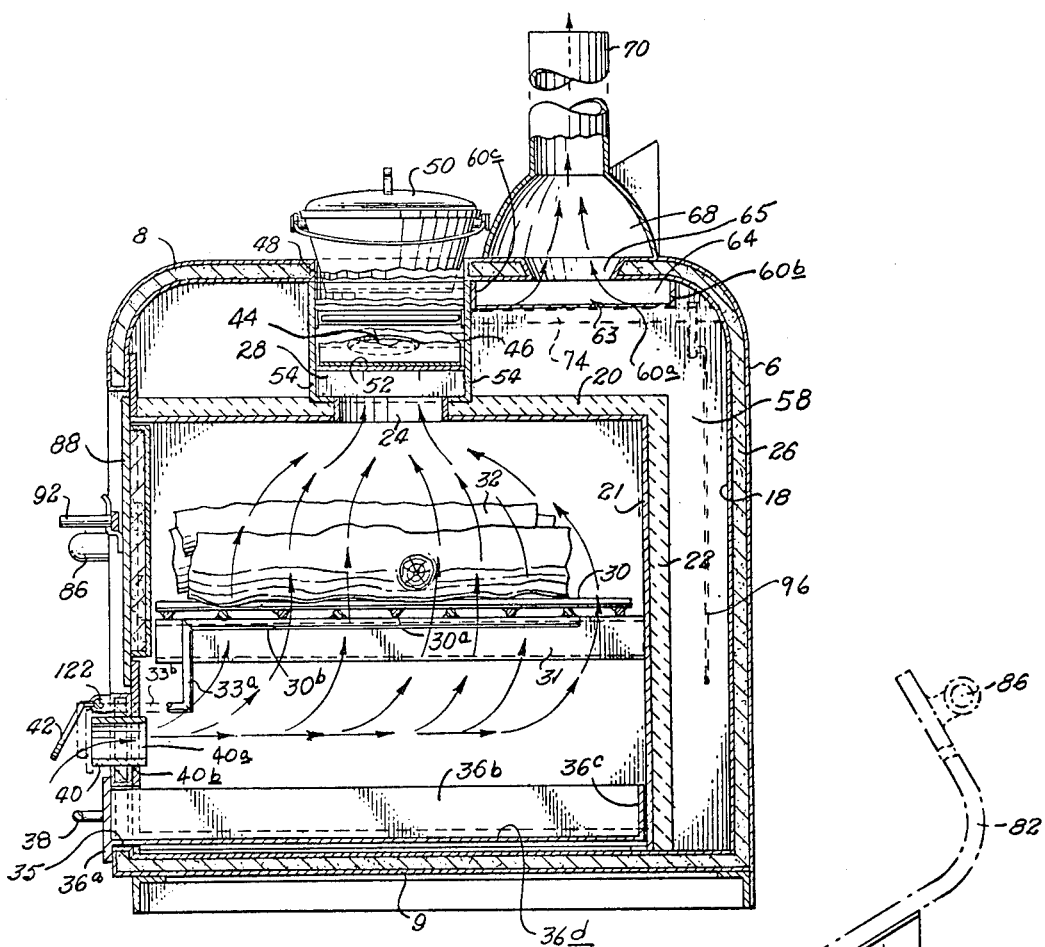
FIG. 5 is a cross-sectional view taken along line 5—5 of FIG. 4.

The fire box compartment 10 as illustrated in FIGS. 4 and 5, has a combustion chamber 10a mounted therein comprising a top wall 20, side walls 21 and 22 and a back wall 23.

The top 20 and walls 21, 22, and 23 of combustion chamber 10a preferably comprise inner panels P of sheet metal encased in ceramic insulation material C and are spaced from top 8, side wall 3 and partition wall 58 to permit dissipation of heat from the outer surface of ceramic insulation material C.

A top 20 of combustion chamber 10a has a passage 24 extending therethrough communicating with the interior of a duct 28 as will be hereinafter more fully explained.

A grate 30 comprising spaced bars 30a and 30b welded or otherwise secured together is supported by support member 31 secured to walls 21 and 22 of combustion chamber 10a to support fuel such as wood logs, charcoal briquets, or other suitable fuel.

Figure 3:
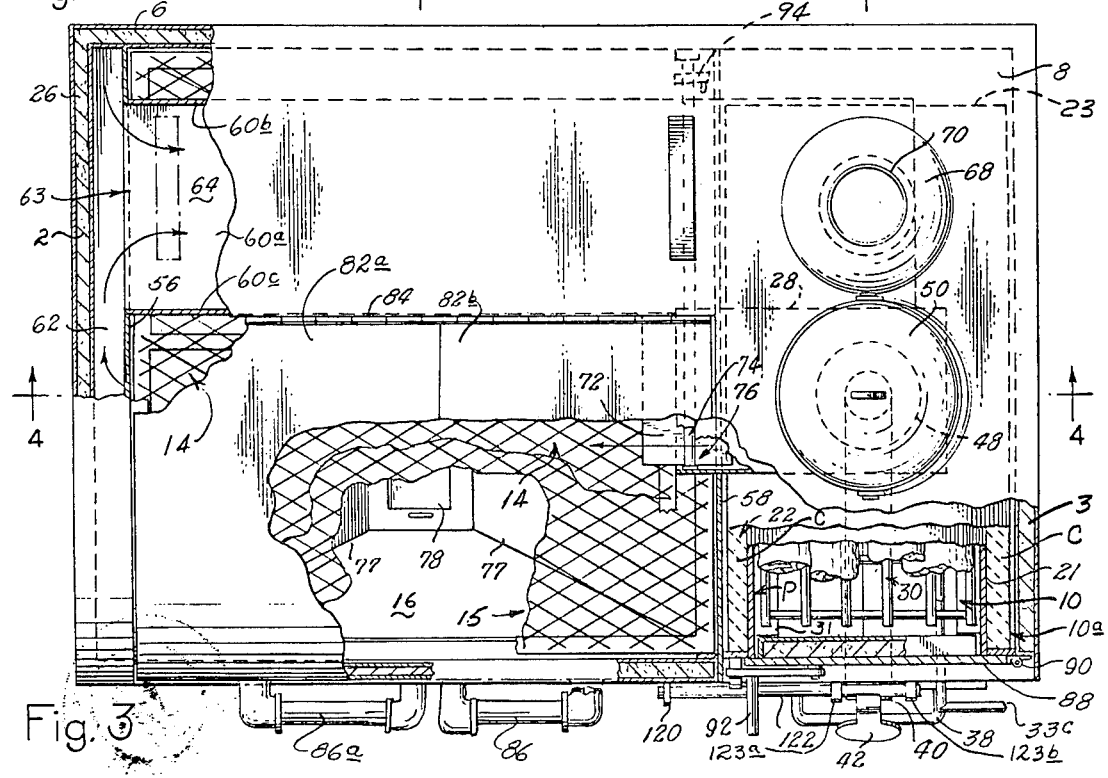
FIG. 3 is a plan view of the first embodiment, parts being broken away to more clearly illustrate details of construction.

A shaker bar comprising legs 33a, 33b, and 33c, is welded or otherwise secured to grate 30 as illustrated in FIGS. 3 and 4 and extends through an opening in front wall 4 to facilitate stoking or stirring the fire. Rotation of leg 33c of the rod imparts shaking motion to grate 30.

A drawer 36, best illustrated in FIGS. 4 and 5, is positioned below grate 30 and comprises a front wall 36a, sides 36b, back 36c, and bottom 36d. Drawer 36 extends through a rectangular opening 35 formed in front wall 4 and has a handle 38 secured to the front wall 36a permitting removal of ashes from combustion chamber 10a.

A hollow tubular member 40 having a passage 40a extending therethrough is positioned in an opening 40b formed in front wall 4 of the oven housing at an elevation below that of grate 30. As will be hereinafter more fully explained, a damper 42 is pivotally secured for movement between the first position illustrated in FIG. 5 permitting flow of air through passage 40a and a second position illustrated in dashed outline closing passage 40a to control air drawn into combustion chamber 10a.

As best illustrated in FIG. 4, duct 28 secured about opening 24 in the upper end of combustion chamber 10a has an opening 44 extending through the wall thereof commmunicating with the interior of tubular member 54 having an upper end extending through the top 8 of the oven housing and having lower ends secured to duct 28. A closure member 52 is pivotally secured to the outer surface of duct 28 and has a handle 53 secured thereto to facilitate moving closure 52 for opening and closing passage 44.

Tubular member 54 preferably has an exhaust passage 48 extending therethrough having an outlet end shaped and positioned to receive a vessel such as bean pot 50 such that heat transferred by conduction through the wall of duct 28 is employed for heating the vessel 50.

Figure 6:
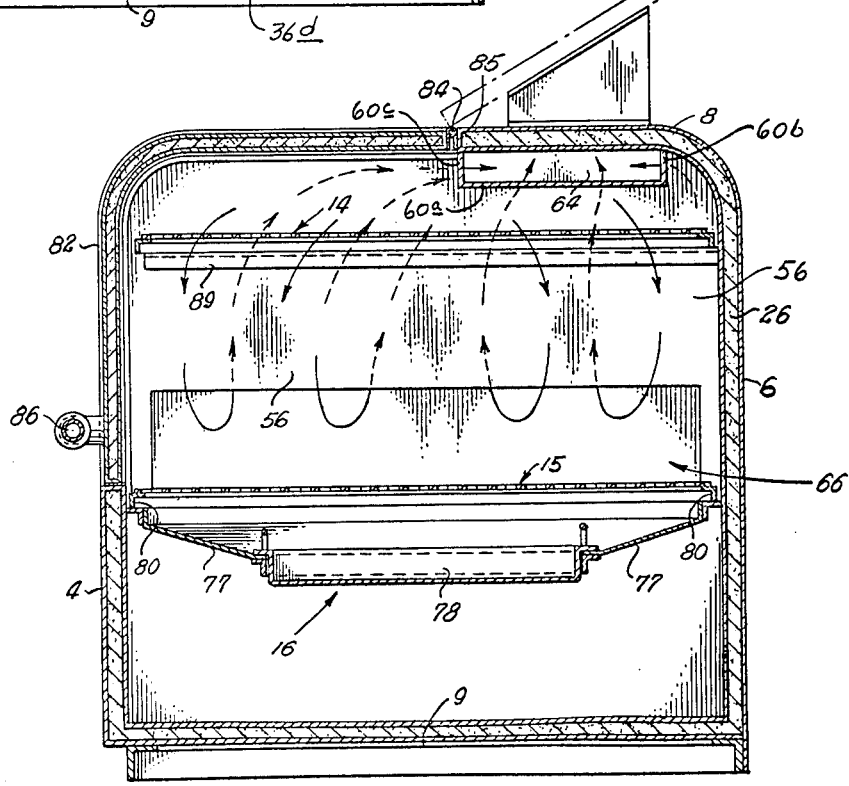
FIG. 6 is a cross-sectional view taken along line 6—6 of FIG. 4.
Figure 7:
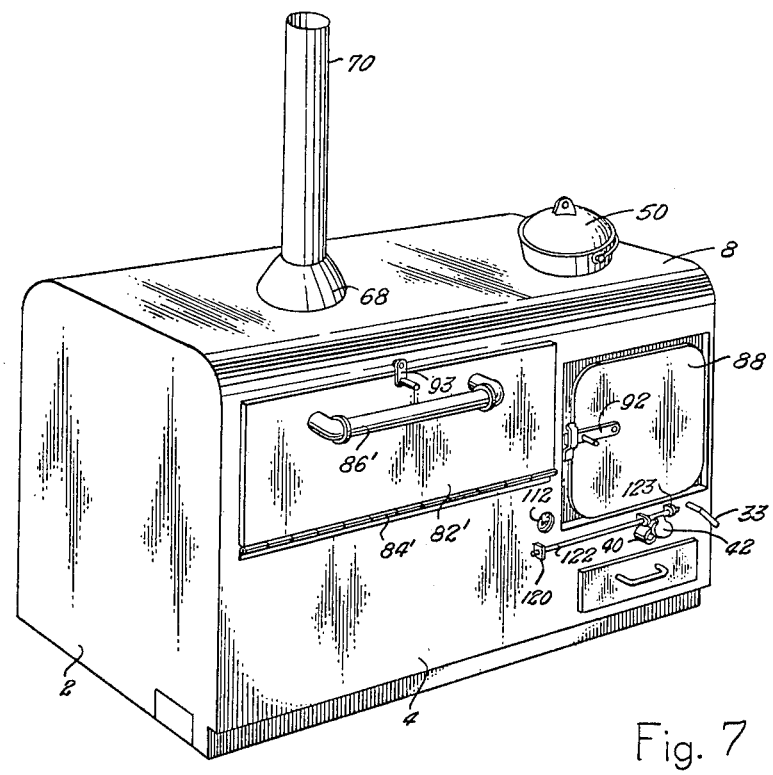
FIG. 7 is a front perspective view of a second embodiment of the cooking oven.
Figure 8:
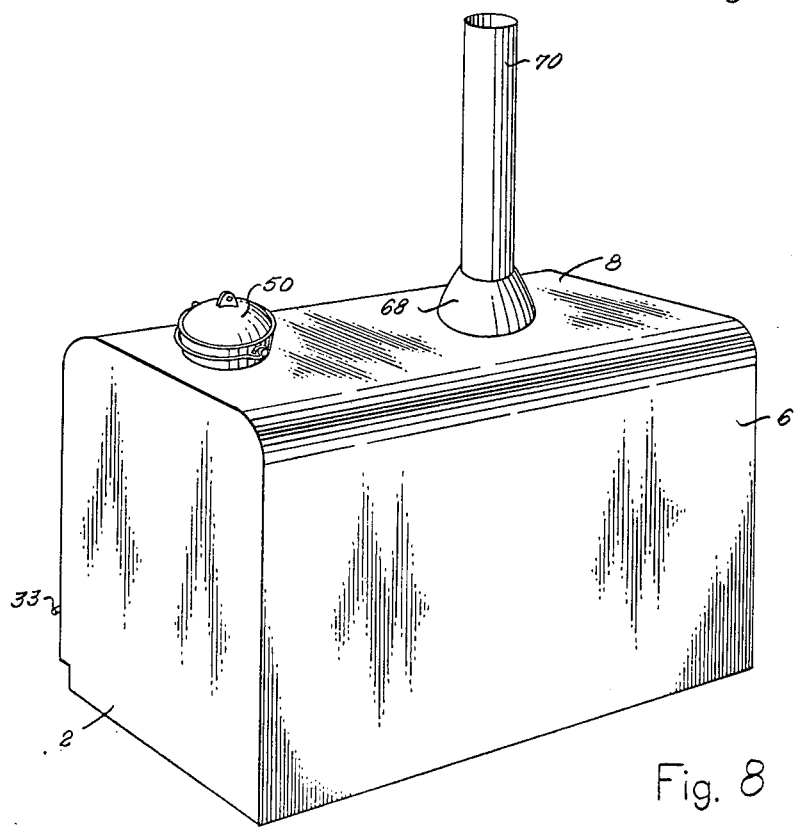
FIG. 8 is a rear perspective view of the second embodiment.
Figure 9:
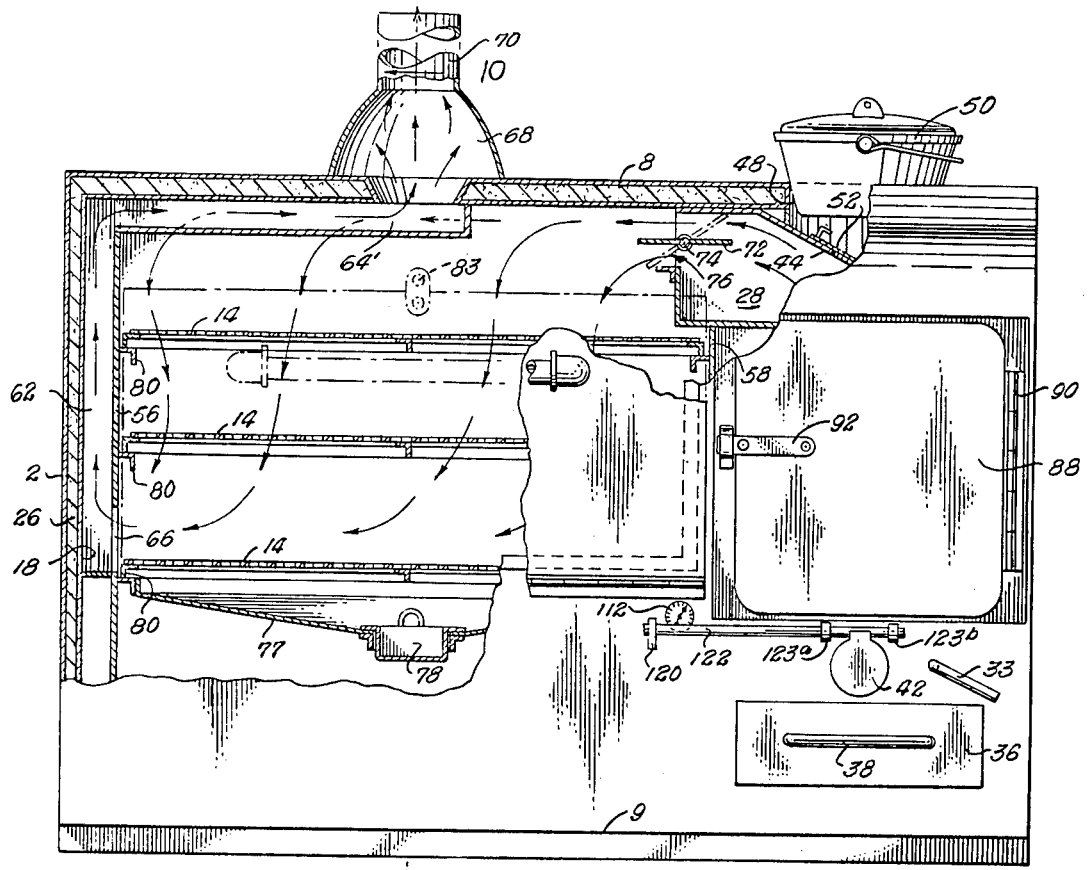
FIG. 9 is a front elevational view of the second embodiment.
Figure 10:
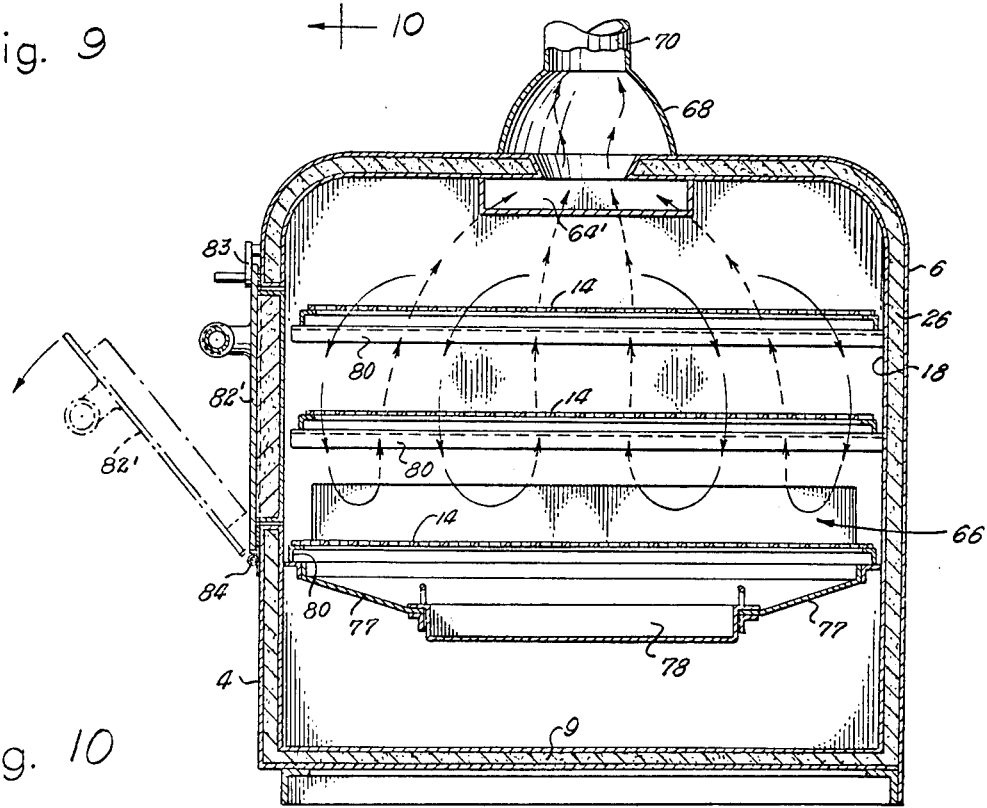
FIG. 10 is a cross-sectional view taken along line 10—10 of FIG. 9.

The cooking oven compartment 12 comprises spaced side walls 56 and 58 having lower ends secured to bottom wall 9 of the oven housing and having upper ends secured to the top wall 8 of the oven housing as illustrated in FIGS. 4, 5, and 6. Back edges of side walls 56 and 58 are welded or otherwise secured to the back wall 6 of the oven housing while front edges are secured to the front wall 4 of the housing.

Side wall 56 of oven compartment 12 is spaced from side wall 2 of the oven housing forming a passage 62 therebetween. An opening 63 is formed in an upper portion of side wall 56 and communicates with a horizontally disposed passage 64 defined by the web 60a and flanges 60b and 60c of a channel member 60 welded or otherwise secured to the inner surface of the top wall 8 of the oven housing.

An opening 65 is formed in the top wall 8 of the oven housing, as illustrated in FIG. 5, and communicates with passage 64. The lower end 68 of a vent pipe 70 is welded or otherwise secured to the top 8 of the housing permitting upward flow of the heated air to ambient atmosphere outside the housing.

As best illustrated in FIGS. 4 and 6 an opening 66 is formed in side wall 56 of cooking compartment 12 at an elevation below the elevation of rack 14.

Duct 28, extending between fire box 10a and cooking compartment 12 extends through an opening 58a formed in side wall 58 of the cooking oven compartment. The duct 28 has an outlet passage 25 communicating with cooking compartment 12. A damper 72 is secured to a shaft 74 extending through apertures in opposite sides of duct 28. As will be hereinafter more fully explained, shaft 74 has a crank 94 secured thereto connected to actuating mechanism for moving damper 72 to open or close passage 25 responsive to changes in temperature in cooking compartment 12.

Cooking compartment 12 has a bottom 77 having downwardly inclined surfaces supporting a removable drip pan 78.

Temperature responsive control apparatus for dampers 42 and 72 is positioned inside the oven housing below the bottom 16. As best illustrated in FIGS. 4 and 5 the temperature responsive control apparatus comprises shaft 100 having opposite ends rotatably secured to the front wall 4 and the back wall 6 of the oven housing and having crank arms 98, 102, 108, and 116 welded or otherwise rigidly secured thereto. A solenoid 106 is secured to bottom 9 of the housing by upwardly extending anchor members 106a and is connected by link 110 to the crank arm 108.

Connector link 96 has one end pivotally secured to crank arm 94 which is rigidly secured to shaft 74 and damper 72 mounted in passage 25, and the other end of connector 96 and pivotally secured to crank arm 98 rigidly secured to shaft 100.

One end of link 118 is pivotally secured to crank arm 116 mounted on shaft 100 and the other end of link 118 is pivotally connected to a crank arm 120 rigidly secured to the end of shaft 122 which is rotatably journaled in bearings 123a and 123b secured to the outer surface of the front wall 4 of the oven housing. Damper 42 is secured to shaft 122 and is positioned adjacent the end of tubular member 40 having the air intake passage 40a extending therethrough.

Means is provided to resiliently bias shaft 100 in a counter-clockwise direction as viewed in FIG. 4, and in the particular embodiment of the invention illustrated in the drawing comprises a spring 104 having one end secured to crank 102 and the opposite end secured by suitable anchor means such as screw 104a to the back wall 6 of the oven housing.

A conventional thermostatically controlled switch 112 is connected through a conductor 126 to temperature sensing element 114 positioned inside the cooking compartment 12. A power line 124 is connected through thermostatically controlled switch 112 and conductor 128 to one side of the winding of solenoid 106. The other side of the winding of solenoid 106 is connected to power line 130.

OPERATION

The operation and function of the apparatus hereinbefore described is as follows:

To initially kindle a fire, door 88 is opened and fuel such as logs 32 is deposited on grate 30 in fire box 10a.

Vessel 50 is removed from passage 48 and closure member 52 is moved to a position wherein free flow of air through passage 44 is permitted.

While combustion of fuel 32 is being initiated heated air and gaseous products of combustion pass upwardly through passage 44 and fresh air is drawn into fire box 10a through intake passage 40b. When fuel 32 is burning sufficiently to cause a substantial volume of heated air to flow upwardly through passage 44 closure member 52 is moved to the position illustrated in FIG. 4 closing passage 44 thereby directing heated air through passage 25 downwardly across meat rack 44, through opening 66, upwardly through passage 62, through passage 63, passage 64, opening 65 and upwardly through vent pipe 70 to atmosphere. Fresh air is drawn through intake passage 40a supporting combustion of fuel 32.

Thermostatically controlled switch 112 is adjusted such that the switch will be closed engergizing the coil of solenoid 106 when temperature in cooking compartment 12 reaches a predetermined temperature, for example 350°F.

Spring 104 exerting force through crank arm 102 resiliently urges shaft 100 in a counter-clockwise direction to the position illustrated in FIG. 4 when temperature in cooking compartment 12 is more than the temperature level required for closing switch 112.

In the position illustrated in FIG. 4 of the drawing damper 72 permits flow of heated gas through opening 25 and damper 42 is urged to the position illustrated in FIGS. 1 and 5 permitting flow of fresh air through air intake passage 40a.

When temperature in cooking compartment 12 reaches the pre-established temperature, for example 350°F, switch 112 will automatically open, breaking the circuits through the winding of solenoid 106 such that spring 104 rotates shaft 100 in a counter-clockwise direction as viewed in FIG. 4 moving damper 72 to close passage 25 and moving damper 42 for closing passage 40a. While damper 42 is positioned across passage 40a the supply of air in the combustion chamber 10a is interrupted. However, when the temperature of cooking compartment 12 decreases to the pre-established temperature, switch 112 will automatically close energizing the winding of solenoid 106 retracting the core 106b urging shaft 100 in a clockwise direction as viewed in FIG. 4 and opening dampers 72 and 42.

From the foregoing it should be readily apparent that the apparatus hereinbefore described accomplishes the objects of the invention. It should be appreciated that other and further embodiments of the invention may be devised without departing from the basic concept thereof.

SECOND EMBODIMENT

The embodiment of the invention illustrated in FIGS. 7–10 of the drawing is identical to the first embodiment of the invention hereinbefore described and like numerals designate like parts, except that the oven compartment access door 82' is pivotally connected by a hinge 84' to the front wall 4 of the oven housing and the vent pipe 70' is located at a position to shorten the length of the path along which heated air must travel through passage 64 to ambient atmosphere.

It should be appreciated that other embodiments may be devised employing the basic concept of the invention.

Having described my invention, I claim:

1. Cooking apparatus comprising: a housing having a top, bottom, sidewalls, frontwall, backwall, and first and second outlet openings extending through said top; a partition in said housing forming a cooking compartment and a fire box compartment; a duct extending between said fire box compartment and said cooking compartment, said duct having an inlet passage communicating with said fire box compartment, a first outlet passage communicating with said first outlet opening extending through the top of the housing, and a second outlet passage communicating with said cooking compartment adjacent the top of the housing; a first damper in said first passage; a second damper in said second passage; a rack in said cooking compartment supported intermediate said top and bottom; and means having an exhaust passage formed therein, said exhaust passage communicating with said cooking compartment below said rack and with said second outlet opening in the top of the housing.

2. The combination called for in claim 1 wherein said first outlet opening in the top of the housing is adapted to receive a cooking vessel.

3. The combination called for in claim 1 with the addition of a fire box in said fire box compartment, said fire box comprising spaced sidewalls, a top having an outlet opening extending therethrough, and a backwall, said side walls of said fire box being spaced from a sidewall of the housing and from said partition in said housing, said top of said fire box being spaced from the top of the housing, and said backwall of the fire box being spaced from the backwall of the housing.

4. The combination called for in claim 3 wherein the frontwall of the housing has an intake opening extending therethrough; an intake damper moveably secured to the frontwall of the housing; temperature sensing means in said cooking compartment, and temperature responsive actuating means connected between said temperature sensing means and said intake damper arranged such that said intake damper is moved to a position closing said intake opening when temperature in said cooking compartment exceeds a predetermined temperature, and said intake damper is moved to a position spaced from said intake opening when temperature in said cooking compartment is less than a predetermined temperature.

5. The combination called for in claim 4 wherein said temperature responsive actuating means comprises a shaft; means to rotatably secure said shaft in said housing; actuated means drivingly secured to said shaft; means to connect the temperature responsive actuating means to the actuated means; a crank secured to said shaft; and connector means secured between said crank and said intake damper.

6. The combination called for in claim 1 wherein the frontwall of the housing has intake opening extending therethrough communicating with said fire box compartment; and intake damper moveably secured to said front wall adjacent said intake opening; a shaft rotatably secured in said housing; a solenoid having a core moveably disposed therein; means to connect said core to said shaft such that said shaft is rotated upon the extension and retraction of said core; a first crank on said shaft; connector means between said first crank and said first damper; a second crank on said shaft; connector means between said second crank and said intake damper; temperature sensing means in said cooking compartment; and thermostatically controlled switching means connected between said temperature sensing means and said solenoid arranged such that said intake damper and said first damper are closed when temperature in said cooking compartment exceeds a predetermined temperature and said dampers are opened when temperature in said cooking compartment is less than the predetermined temperature.

* * * * *